(12) United States Patent
Schuller

(10) Patent No.: US 7,099,038 B2
(45) Date of Patent: Aug. 29, 2006

(54) METHOD AND SYSTEM FOR CONTROLLING MESSAGES PRINTED BY AN IN-STORE LABEL PRINTER AND RELATED LABEL STRUCTURE

(75) Inventor: Robert J. Schuller, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 10/967,799

(22) Filed: Oct. 18, 2004

(65) Prior Publication Data

US 2005/0055637 A1   Mar. 10, 2005

Related U.S. Application Data

(63) Continuation of application No. 10/389,474, filed on Mar. 14, 2003, which is a continuation of application No. 09/663,285, filed on Sep. 15, 2000.

(51) Int. Cl.
    *G06F 13/00*  (2006.01)

(52) U.S. Cl. .................................. 358/1.18; 428/40.1
(58) Field of Classification Search ............... 358/1.18; 428/40.1
    See application file for complete search history.

(56) References Cited

U.S. PATENT DOCUMENTS

| 2,420,045 | A | 5/1947 | Krug |
| 3,711,683 | A | 1/1973 | Hamisch, Sr. |
| 3,757,037 | A | 9/1973 | Bialek |
| 3,994,089 | A | 11/1976 | Schwartz |
| 4,188,250 | A | 2/1980 | Grass |
| 4,188,251 | A | 2/1980 | Grass et al. |
| 4,188,427 | A | 2/1980 | Grass |

(Continued)

FOREIGN PATENT DOCUMENTS

EP    0362075    4/1990

(Continued)

OTHER PUBLICATIONS

Ishida, *AC-3000 Series* brochure, 6 pages, published at least as early as Nov. 26, 1996.

(Continued)

*Primary Examiner*—David Moore
*Assistant Examiner*—Alan Rahimi
(74) *Attorney, Agent, or Firm*—Thompson Hine LLP

(57) ABSTRACT

A method for selectively printing different messages on labels printed by an in-store scale involves providing an in-store scale including a label printing mechanism with a supply of labels and a communications link for receiving information from a site external to the store. The scale label printing mechanism is configured in a first state and, during the first state, simultaneous printing of two types of information on a first label takes place. In particular, both (i) product information for a specified product to which the first label will be applied and (ii) a first message pertaining to a product which is different than the specified product to which the first label will be applied, are printed on the first label. The in-store scale receives a message control signal via the communications link which configures the scale label printing mechanism in a second state. During the second state, simultaneous printing of two types of information on a second label takes place. In particular, both (i) product information for a specified product to which the second label will be applied and (ii) a second message, different than the first message, and also pertaining to a product which is different than the specified product to which the second label will be applied, are printed on the second label.

16 Claims, 5 Drawing Sheets

U.S. PATENT DOCUMENTS

| | | | |
|---|---|---|---|
| 4,323,608 A | 4/1982 | Denny et al. | |
| 4,423,486 A | 12/1983 | Berner | |
| 4,457,539 A | 7/1984 | Hamisch, Jr. | |
| 4,598,780 A | 7/1986 | Iwasaki et al. | |
| 4,674,041 A | 6/1987 | Lemon et al. | |
| 4,685,702 A | 8/1987 | Kazuharu | 283/81 |
| 4,723,212 A | 2/1988 | Mindrum et al. | |
| 4,821,186 A | 4/1989 | Munakata et al. | |
| 4,895,747 A | 1/1990 | Birkholz et al. | 428/40.9 |
| 4,901,237 A | 2/1990 | Hikita et al. | |
| 4,901,457 A | 2/1990 | Chandler | |
| 4,910,672 A | 3/1990 | Off et al. | |
| 4,928,229 A | 5/1990 | Teraoka et al. | |
| 4,929,818 A | 5/1990 | Bradbury et al. | |
| 4,932,485 A | 6/1990 | Mori | |
| 5,083,638 A | 1/1992 | Schneider | |
| 5,172,936 A | 12/1992 | Sullivan et al. | |
| 5,173,851 A | 12/1992 | Off et al. | |
| 5,185,695 A | 2/1993 | Pruchnicki | |
| 5,200,889 A | 4/1993 | Mori | |
| 5,329,713 A | 7/1994 | Lundell | |
| 5,350,612 A | 9/1994 | Stern et al. | |
| RE34,915 E | 4/1995 | Nichtberger et al. | |
| 5,439,721 A | 8/1995 | Pedroli et al. | |
| 5,560,718 A | 10/1996 | Furuya | |
| 5,578,797 A * | 11/1996 | Hewitt et al. | 177/5 |
| 5,612,868 A | 3/1997 | Off et al. | |
| 5,642,485 A | 6/1997 | Deaton et al. | |
| 5,649,114 A | 7/1997 | Deaton et al. | |
| 5,676,785 A | 10/1997 | Samonides | |
| 5,758,328 A | 5/1998 | Giovannoli | |
| 5,774,868 A | 6/1998 | Cragun et al. | |
| 5,832,457 A | 11/1998 | O'Brien et al. | |
| 5,857,175 A | 1/1999 | Day et al. | |
| 5,865,470 A | 2/1999 | Thompson | |
| 5,866,181 A | 2/1999 | Hill | |
| 5,887,271 A | 3/1999 | Powell | |
| 5,892,827 A | 4/1999 | Beach et al. | |
| 5,895,075 A | 4/1999 | Edwards | |
| 5,926,795 A | 7/1999 | Williams | |
| 5,943,654 A | 8/1999 | Goodwin, III et al. | |
| 5,956,877 A | 9/1999 | Raasch et al. | |
| 5,974,396 A | 10/1999 | Anderson et al. | |
| 5,974,399 A | 10/1999 | Giuliani et al. | |
| 6,009,411 A | 12/1999 | Kepecs | |
| 6,014,634 A | 1/2000 | Scroggie et al. | |
| 6,026,370 A | 2/2000 | Jermyn | |
| 6,026,373 A | 2/2000 | Goodwin, III | |
| 6,041,309 A | 3/2000 | Laor | |
| 6,042,149 A | 3/2000 | Roshkoff | |
| 6,047,263 A | 4/2000 | Goodwin, III | |
| 6,055,573 A | 4/2000 | Gardenswartz et al. | |
| 6,067,524 A | 5/2000 | Byerly et al. | |
| 6,076,069 A | 6/2000 | Laor | |
| 6,138,911 A | 10/2000 | Fredregill et al. | |
| 6,151,586 A | 11/2000 | Brown | |
| 6,151,587 A | 11/2000 | Matthias | |
| 6,240,394 B1 | 5/2001 | Uecker et al. | |
| 6,270,871 B1 | 8/2001 | Scholz et al. | |
| 6,278,979 B1 | 8/2001 | Williams | |
| 6,282,516 B1 | 8/2001 | Giuliani | |
| 6,287,031 B1 | 9/2001 | Willis | |
| 6,304,849 B1 | 10/2001 | Uecker et al. | |
| 6,307,958 B1 | 10/2001 | Deaton et al. | |
| 6,321,210 B1 | 11/2001 | O'Brien et al. | |
| 6,334,108 B1 | 12/2001 | Deaton et al. | |
| 6,351,735 B1 | 2/2002 | Deaton et al. | |
| 6,576,315 B1 | 6/2003 | Treleaven et al. | |
| 6,613,410 B1 | 9/2003 | Sellars | |
| 2003/0205412 A1 | 11/2003 | Hewitt et al. | |

FOREIGN PATENT DOCUMENTS

| | | |
|---|---|---|
| EP | 0837411 A1 | 4/1998 |
| EP | 0853290 A2 | 7/1998 |
| EP | 0853290 A3 | 1/1999 |
| EP | 01116328 | 11/2003 |
| FR | 2741987 | 6/1997 |
| JP | 60193824 | 10/1985 |
| JP | 63144667 | 6/1988 |
| JP | 63178875 | 7/1988 |
| JP | 63191370 | 8/1988 |
| JP | 3138171 | 6/1991 |

OTHER PUBLICATIONS

Hobart Food Equipment, "CLA Compact Label Applier", For Trayed Self-Service Meat, Poultry, Fish and Produce, May 1993.

Hobart Food Equipment, "Hilite Label Printer & Applier", For Printing and Applying Merchandising Labels, May 1988.

Hobart Food Equipment, "Ultima 2000 PLU Prepack Weighing System", The Hobart Ultima 2000 PLU Prepacking Weighing System Provides Merchandising Flexibility, Nutritional and Text Printing and Is Very Simple To Use, Mar. 1993.

Hobart, "ULTIMA 2000", The ultimate pre-pack scale/printer merchandising system, Dec. 1992.

Hobart, "Weigh/Wrap/Label Systems", Aug. 1999.

* cited by examiner

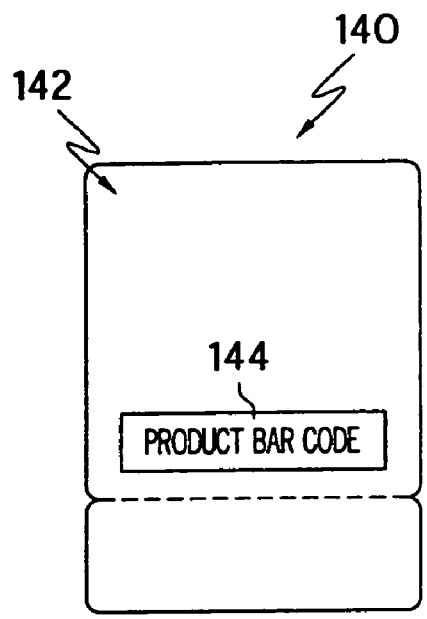
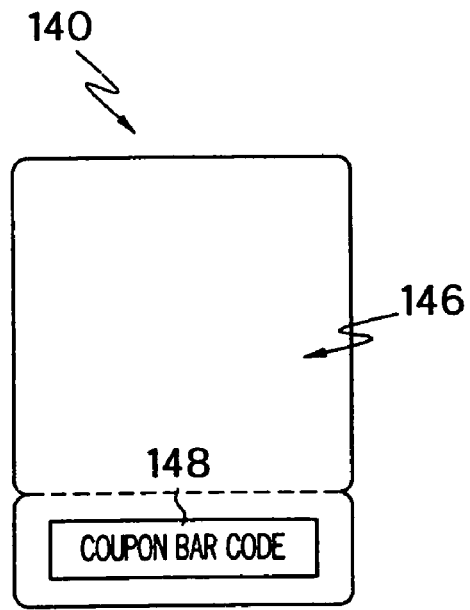
FIG. 7A  FIG. 7B
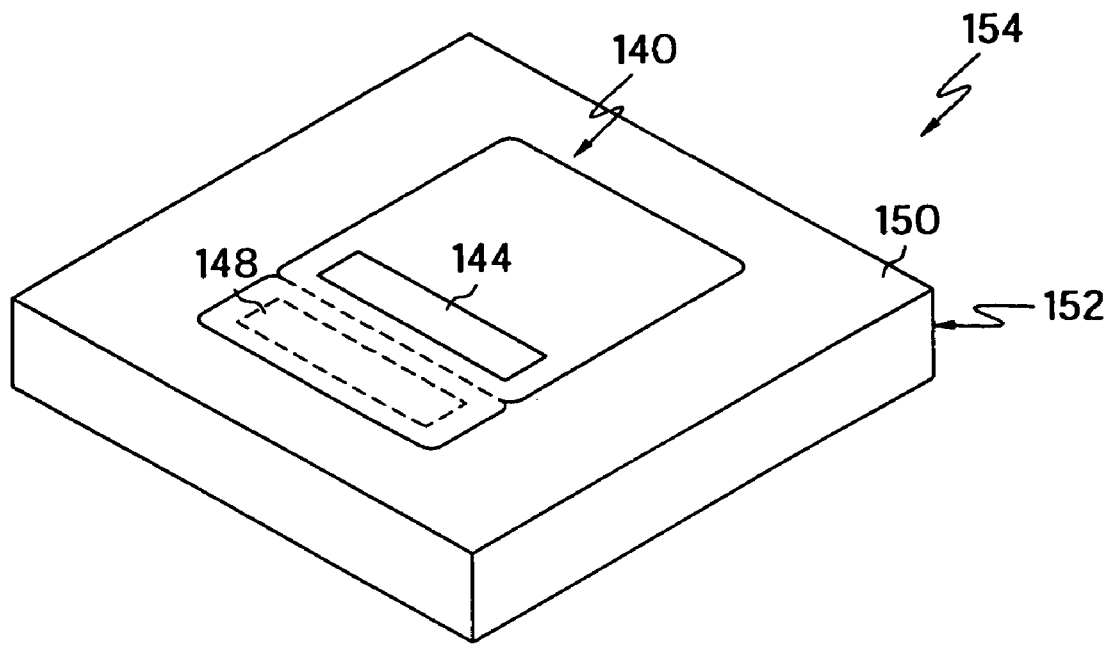
FIG. 8

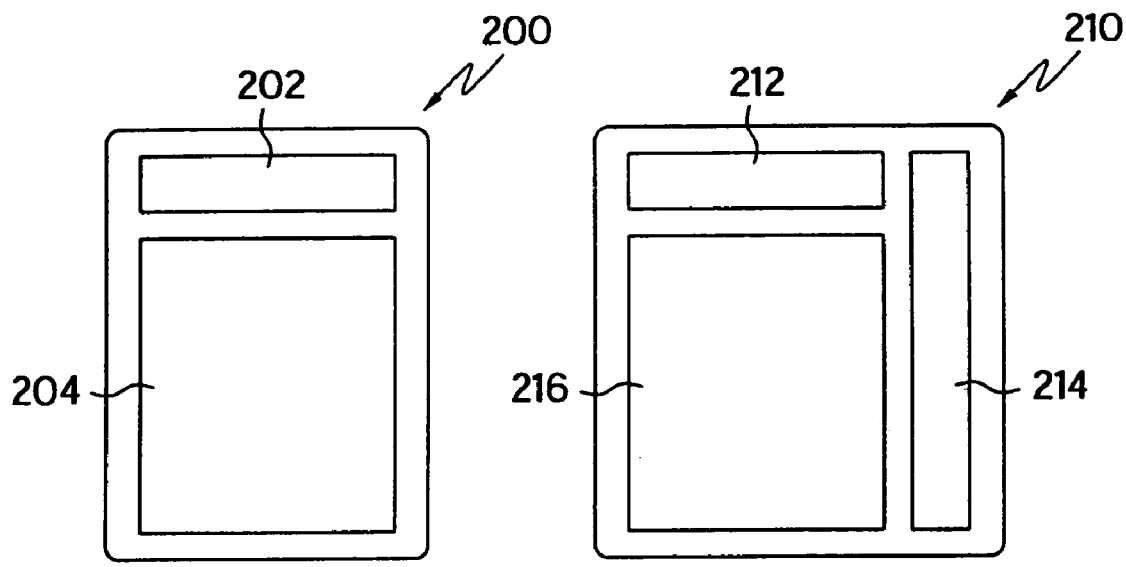
FIG. 9A
(PRIOR ART)
FIG. 9B
(PRIOR ART)
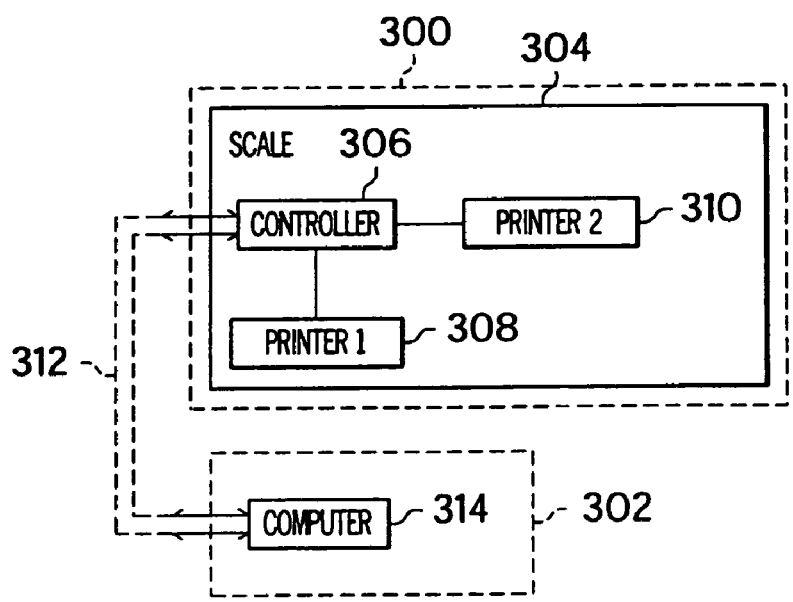
FIG. 10
(PRIOR ART)

METHOD AND SYSTEM FOR CONTROLLING MESSAGES PRINTED BY AN IN-STORE LABEL PRINTER AND RELATED LABEL STRUCTURE

CROSS-REFERENCE TO RELATED APPLICATIONS

This application is a continuation of U.S. application Ser. No. 10/389,474, filed Mar. 14, 2003, which in turn is a continuation of U.S. application Ser. No. 09/663,285, filed Sep. 15, 2000.

FIELD OF THE INVENTION

The present invention relates generally to in-store printer mechanisms utilized for printing labels applied to products and to label structures utilized by such printer mechanisms, and more particularly, to a method and system for controlling messages printed on labels by an in-store scale for increasing marketing and promotional opportunities.

BACKGROUND OF THE INVENTION

The perishable foods sections of most supermarkets and grocery stores such as the meat department, bakery, deli and produce department, typically include one or more in-store printers for printing labels with item name, weight or count, and price information. The labels are then applied to the packaged items. Many such printers are provided as part of in-store scales or systems including scales. FIG. 9A represents a front surface view of a typical pre-printed label 200 which may be utilized in the scale. The label 200 is often times pre-printed with store-specific information such as the store name and/or logo in a predetermined portion 202 of the label and a remaining portion 204 of the label is left blank to permit the scale printer to print product name, weight, price information, and product bar code in such space. FIG. 9B represents a front surface view of another label 210 which has been used in the past and which is pre-printed with store-specific information such as the store name and/or logo in a predetermined portion 212 and is also pre-printed in label portion 214 with an advertisement message/logo which may relate to any other product sold in the store. Remaining portion 216 is left blank to permit the scale printer to print product name, weight, price information, and product bar code in such space. The problem with the pre-printed advertisement is that it is permanent and cannot be adjusted at the store.

Increasingly, in-store equipment such as scales/scale systems may include a communications link for receiving information externally of the store. As used herein the term scale system refers to any scale device or any larger device which includes a scale, such as a weigh/wrap machine. For example, prior art scale systems exist in which pricing information in the goods database is updated remotely from a central location so that all related stores in a chain use the same pricing scheme. Chain personnel can also use communications links with in-store scale systems to monitor scale status/function. Still further, prior art in-store scale systems exist which are capable of printing two labels, one which includes the product and price information and another which prints a marketing message. An example of such a prior art system is illustrated in FIG. 10 where a store 300 is shown and external site 302 is shown. A scale system 304 including a controller 306 and associated printer 308 is located in the store 302, along with a second printer 310 which is connected to controller 306 for control thereby. The controller 306 is also connected via communications link 312 to a computer 314 at external site 302. In the illustrated system, computer 314 has been used to control pricing information used by scale 304 for printing on a first label by printer 308, and to also control merchandising messages printed on a second, separate label by printer 310, where the pricing information printed by printer 308 and the merchandising information printed by printer 310 related to the same product. Examples of merchandising messages printed on the second label by printer 310 include "Great For The Grill" or "100% Pure Ground Beef" or "50¢ Off". Such prior art systems have also been used to print similar merchandising messages, regarding the product to which a pricing label is applied, on the pricing label itself.

Product manufacturers, distributors, advertisers and store operators are continually looking for new and improved ways to market and advertise products within the store. Accordingly, given the number of labels printed on a daily basis by such scales, and the fact that the packages containing such labels are typically placed directly in front of consumers or into the consumer's hands, it would be desirable to utilize such scales to deliver marketing and promotional messages for numerous products in a controlled manner.

In the label printing field it is also known to provide coupons on labels which are applied to products. For example, U.S. Pat. No. 5,578,797 provides a label structure which includes both a product bar code and a coupon bar code on a front surface of the label. The coupon portion of the label is designed to be torn off by the customer. However, some customers may not tear off the coupon. In such cases, this label structure can be problematic because checkout scanners can be confused by the presence of two bar codes on the label. Accordingly, it would also be desirable to provide a label structure which provides coupon capability while overcoming the aforementioned problem.

SUMMARY OF THE INVENTION

In one aspect of the present invention, a method for selectively printing different messages on labels printed by an in-store scale involves providing an in-store scale including a label printing mechanism with a supply of labels and a communications link for receiving information from a site external to the store. The scale label printing mechanism is configured in a first state and, during the first state, simultaneous printing of two types of information on a first label takes place. In particular, both (i) product information for a specified product to which the first label will be applied and (ii) a first message pertaining to a product which is different than the specified product to which the first label will be applied, are printed on the first label. The in-store scale receives a message control signal via the communications link which configures the scale label printing mechanism in a second state. During the second state, simultaneous printing of two types of information on a second label takes place. In particular, both (i) product information for a specified product to which the second label will be applied and (ii) a second message, different than the first message, and also pertaining to a product which is different than the specified product to which the second label will be applied, are printed on the second label. Thus, the method enables messages imprinted on labels to be selectively controlled by parties such as the manufacturer or distributor of the predetermined product, or an advertising agency charged with increasing sales of the predetermined product.

In one variation of the method, the first and second messages relate to coupon discount amounts for the predetermined product. In connection with this variation, another aspect of the invention provides a label structure including a base paper having front and rear surfaces, at least one pre-printed information region toward the rear surface of the base paper. The pre-printed information region is formed by an adhesive layer adjacent the rear surface of the base paper, an adhesive deadening layer overlaying the adhesive layer in a defined area, and a layer of printed information overlaying at least portions of the adhesive deadening layer. The layer of printed information may include a coupon bar code which can be tied to the coupon discount information to be printed on the front surface of the label. Because the coupon bar code is provided on the rear surface of the label, it will face inward against a package and will not cause confusion with the product bar code on the front surface of the label during scanning, in the event the customer does not detach the coupon before checkout.

Still a further aspect of the invention provides a method for controlling an in-store label coupon printing system involves providing an in-store label printing mechanism including a controller and associated memory, and a user input device. A supply of labels is also provided for the in-store printing mechanism, each label including a pre-printed coupon bar code on a rear surface portion thereof. The user input device is selectively utilized to establish a coupon message to be printed on a front surface of the labels by the in-store printing mechanism. A stored discount amount associated with the coupon bar code is provided in at least one of an in-store point-of-sale computer system memory and a store computer system memory. The stored discount amount is adjusted as needed to coincide with changes made in the coupon message printed by the in-store label printing mechanism.

BRIEF DESCRIPTION OF THE DRAWINGS

FIGS. 7A and 7B show front and rear surface views of a printed label;

FIG. 8 is a perspective view of a labeled package assembly;

FIGS. 9A and 9B show front and rear surface views of prior art labels; and

FIG. 10 is a schematic diagram of a prior art system.

DETAILED DESCRIPTION OF THE EMBODIMENTS

Figure 1:
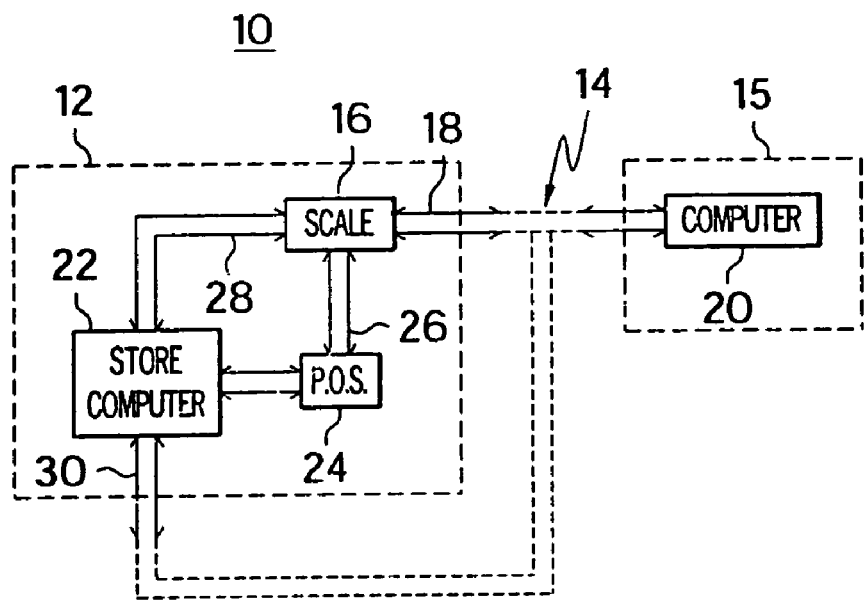
FIG. 1 is a schematic diagram of one embodiment of a label printing system in accordance with the present invention.

Referring to drawing FIG. 1, a schematic diagram of a system 10 useful in carrying out the present invention includes a store 12, a communications path 14, and a retail headquarters, product manufacturer, distributor or advertising agency location 15. The store includes scale system 16 which is connected to the communications path 14 via communications link 18 for receiving externally generated messages, such as those generated by a computer 20 at location 15. The store 12 also includes a store computer system 22 which may be used for tracking and maintaining inventory and a point-of-sale (POS) computer system 24 which is utilized for customer checkout and typically includes a plurality of bar code scanners. Communications link 26 between the scale system 16 and POS system 24 may be provided and communications link 28 between the store computer system 22 and scale system 16 may also be provided. While the use of communications link 18 to enable the scale to receive external messages is preferred, it is recognized that the scale could receive such externally generated messages via indirect links such as a communications link comprised of link 30, store computer system 22 and link 28. Links 18, 26, 28 and 30 are preferably hard-wired links such as typical telephone line or coax links, but it is recognized that wireless links could also be utilized. Communications path 14 may preferably be an Internet link but might also be a dedicated type link. In either case the path may be formed by any one of hard-wired, fiber-optic or wireless type arrangements, and combinations of the same.

Figure 2:
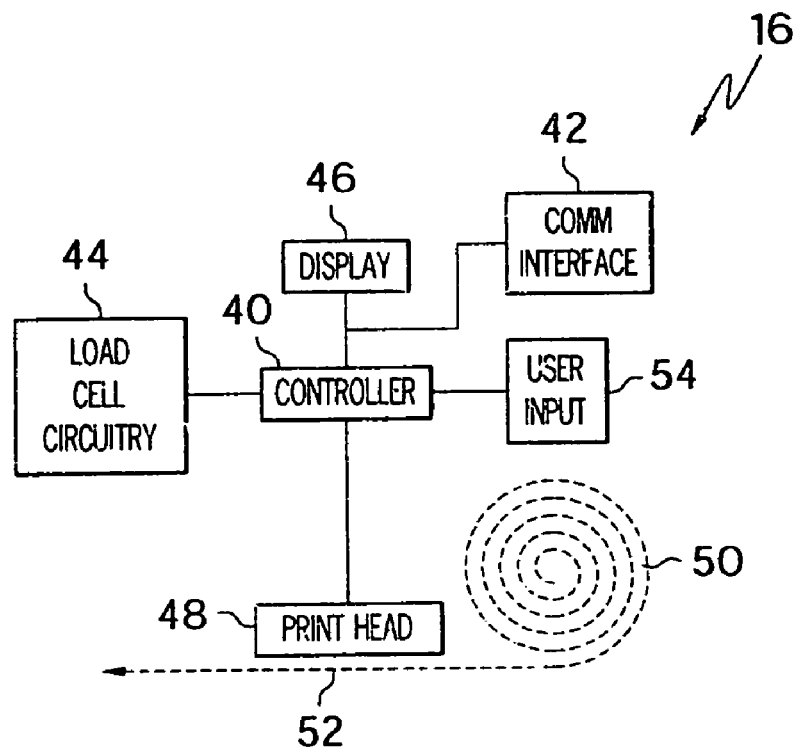
FIG. 2 is a schematic diagram of a scale mechanism including a label printer.

As shown in FIG. 2, the scale system 16 includes a controller 40 with an associated communications interface 42. The controller 40 typically includes associated memory for storing firmware, software and data as needed. At least one load cell and associated circuitry 44 are provided for delivering weight information to the controller 40. The controller 40 is connected for controlling a display 46 such as an LED or LCD, and also for controlling a printing mechanism portion which includes print head 48, label supply 50, and mechanism such as a motor drive (not shown) for moving label stock past the print head 48 along a predefined path 52. A user input device 54 such as a plurality of user input keys or a touch screen arrangement associated with the display 46 enables a user to input information such as the product type and cost per pound or product code, as well as other information, to the controller 40.

Figure 3:
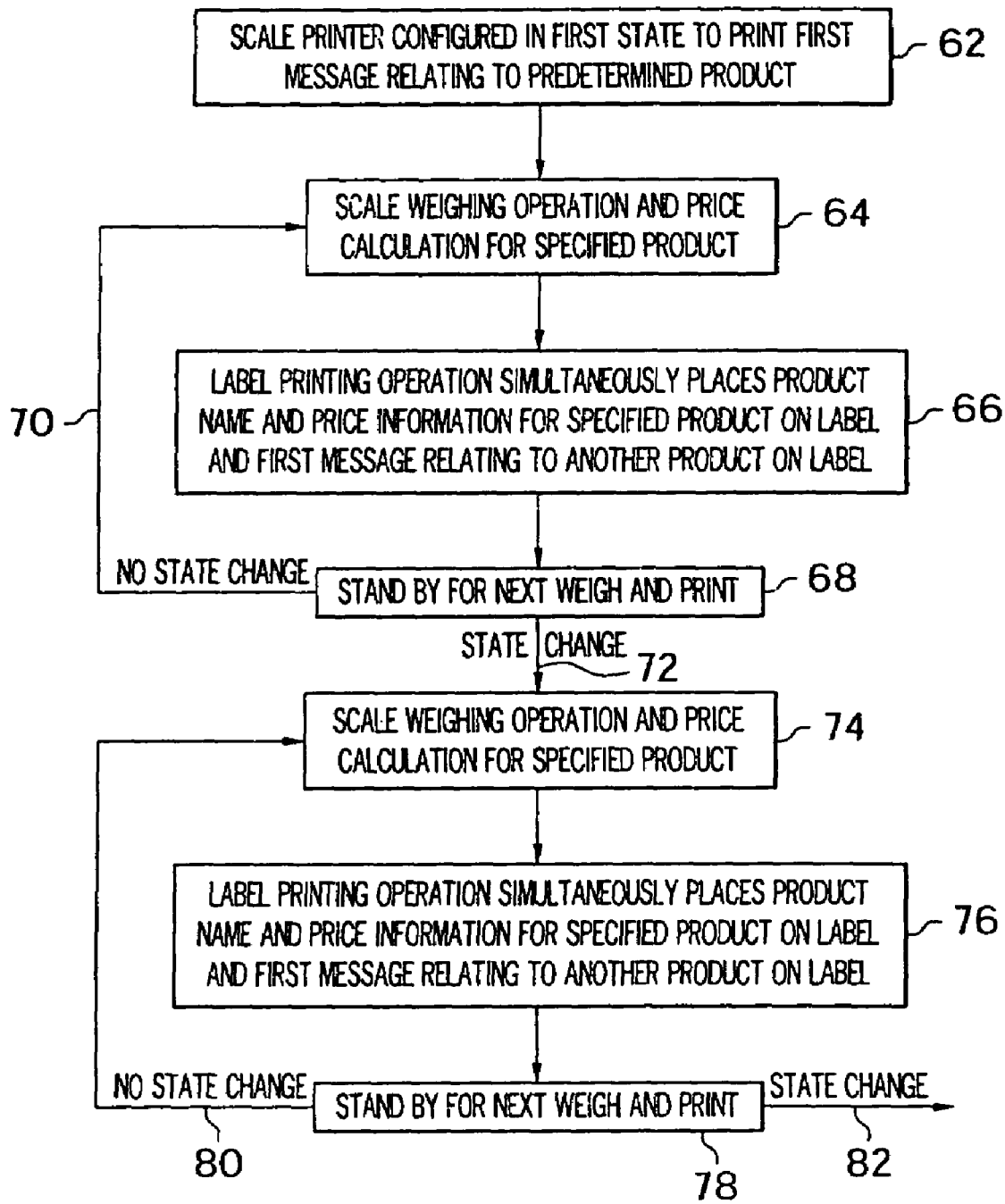
FIG. 3 is a flowchart of steps according to one embodiment of a method of the present invention.

Scale system 16 may be representative of the typical scale system utilized in one or more of the perishables departments of a supermarket or grocery store for printing labels which are then applied to products. For example, stand alone scales in the deli department print labels which are typically applied to lunch meats, cheeses, side salads and the like. Such scales can also be utilized in the produce department or meat and fish departments. Weigh/wrap type machines are also commonly used. Regardless of where the scale system is located, the present invention enables it to be utilized in a new and improved manner for selective control of messages printed on labels. In particular, referring to the flow chart 60 of FIG. 3, exemplary steps in one embodiment of the message control method of the present invention are shown. It is assumed at initial step 62 that the in-store scale system 16 including label printing mechanism 48, supply of labels 50, and communications link 18 for receiving information from a site external to the store is configured in a first state. At step 64 a specified product (e.g. lunch meat) is weighed and price calculated. At step 66 simultaneous printing of two types of information on a first label takes place. In particular, both (i) product information (name and price) for the specified product to which the first label will be applied and (ii) a first message pertaining to a product (e.g. potato chips) which is different than the specified product, are printed on the first label. Thereafter, at step 68 a stand by for the next weigh and print is indicated. If there is no change from the first state of the scale system printer then path 70 will be followed and the next label will be simultaneously imprinted with specified product information and the first message. However, if there is a change from a first state of the scale printer to a second state of the scale system printer, then path 72 will be followed and the next scale weigh operation will take place at step 74 and at step 76 simultaneous printing of two types of information on a second label takes place. In particular, both (i) product information (name and price) for the specified product to which the second label will be applied and (ii) a second message, different than the first and pertaining to the a product which is different than the specified product, are printed on the second label. A new standby state 78 is then shown, with optional paths 80 and 82 according to whether a state change in the scale system printer occurs.

As used herein, the terminology "simultaneous printing" of information on a label refers to printing which takes place on the label as it passes by the printhead in a single pass, and encompasses, without limitation, both side-by-side printing of information and printing first information on a first portion of the label as the first portion passes by the print head and, subsequently, printing second information on a second portion of the label as the second portion of the label passes by the print head.

The state change of the scale system printer may be controlled by receipt by the in-store scale of a message control signal via the communications link which configures the scale label printer in a second state. In one embodiment the scale 16 includes a stored table of selectable message options, each including an associated message indicator as shown in representative Table I below:

TABLE I

STORED MESSAGE OPTIONS TABLE

Message Indicator  Message Option

| | |
|---|---|
| 0000 | 50 Cents Off - Expires MM/DD/YY |
| 0001 | 25 Cents Off - Expires MM/DD/YY |
| 0010 | 10 Cents Off - Valid MM/DD/YY - MM/DD/YY |
| 0011 | 2 For 1 Special - Valid MM/DD/YY - MM/DD/YY |
| 0100 | Try New (BRAND) Chips - Now With Less Fat |
| 0101 | Try (BRAND)'s New Barbecue Style |

In this arrangement, the scale system also includes a memory location including a selected message indicator. Thus, in state 1 of the example described above the stored selected message indicator could be "0000" in which case during the printing operation of step 66 the scale controller references stored message options Table I and retrieves the "50 Cents Off—Expires MM/DD/YY" message for printing. The control message received via the communications link to cause the state change will be another message indicator such as "0010" which in turn is automatically and immediately overwritten into the selected message indicator memory location. Thereafter, during the printing operation of step 76 the scale controller references stored message options Table I and retrieves the "10 Cents Off—Valid MM/DD/YY—MM/DD/YY" message for printing. Alternatively, the control message received via the communications link may include a new message indicator and associated time or date at which such new message indicator is to be utilized as the selected message indicator. In such cases the data structure storing the selected message indicator may also comprise a table such as Table II below:

TABLE II

SELECTED MESSAGE INDICATORS

| Start Date | Selected Message Indicator |
|---|---|
| MM/DD/YY | 0000 |
| MM/DD/YY | 0010 |
| MM/DD/YY | 0100 |

In this arrangement the scale system controller is configured to utilize a running time clock to determine when to change the scale system printer state and begin using a new message indicator. Thus, externally generated message control signals can be utilized to establish a future message selection pattern as desired.

Utilizing the stored message table technique enables the store owner/operator and the outside entity (product manufacturer, distributor or advertiser) to agree upon permissible messages in advance. However, an alternative embodiment in which the scale system merely stores the message to be printed for state 1 in memory and in which the message control signal received by the scale contains the new message for printing (as opposed to a message indicator) in state 2 is contemplated. Still further, where the stored message table arrangement is utilized, it is possible that the communications link could be utilized to update or revise the stored message table in memory of the scale. In either embodiment, the system and method enables messages printed on labels in the store to be selectively controlled by parties such as chain personnel at retail headquarters, the manufacturer or distributor of the predetermined product, or an advertising agency charged with increasing sales of the predetermined product.

It is recognized that Table I is merely representative of one type of message options table and that others could be utilized. For example, an alternative message options table is set forth below as Table III:

TABLE III

STORED MESSAGE OPTIONS TABLE

| Message Indicator | Message Option - Part 1 | Message Option - Part 2 |
|---|---|---|
| 0000 | 50 Cents Off | Expires MM/DD/YY |
| 0001 | 25 Cents Off | Expires MM/DD/YY |
| 0010 | 10 Cents Off | Valid MM/DD/YY - MM/DD/YY |
| 0011 | 2 For 1 Special | Valid MM/DD/YY - MM/DD/YY |
| 0100 | Try New (BRAND) Chips | Now With Less Fat |
| 0101 | (BRAND)'s Barbecue Style | Preferred 2 To 1 |

Notably, Table II includes two message option parts which the controller can retrieve for printing at different locations on the label. It is also contemplated that a three-dimensional message table or map could be utilized. Such a table could store messages as a function of message indicator and specified product to which a label is to be applied, so that the message is varied according to selected message indicator and the product to which the label is to be applied. For example, if steak is purchased a message for one product might be printed while if hot dogs are purchased a message for another product might be printed.

Figure 4A:
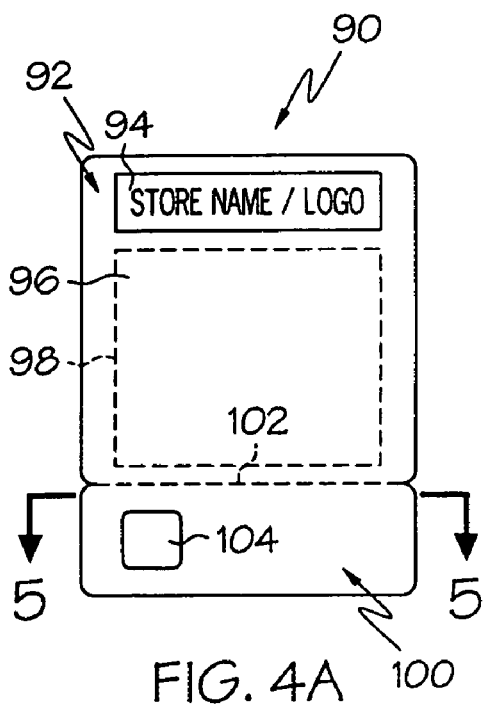
FIGS. 4A and 4B show front and rear surface views of one embodiment of a label structure according to the invention.
Figure 4B:
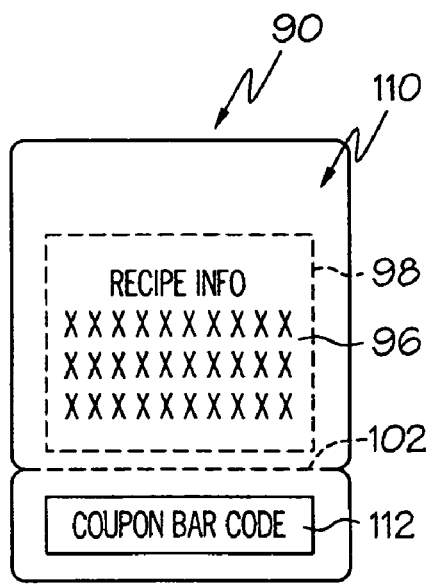

As demonstrated by the last two messages in each of Tables I and III, the messages which are selected for printing may be non-coupon messages. However, in a preferred arrangement the messages which are selected for printing on labels output by the scale system relate to coupon discount information for the predetermined product. For example, as indicated in Table I above the message may be an amount off, a 2 for 1 type special, or might also be a percent off type coupon discount amount. In this regard, a preferred label structure 90 for use in combination with the message control method is illustrated in front and rear surface views respectively in FIGS. 4A and 4B. Label structure 90 includes a front face 92 having a store name/logo 94 pre-printed thereon, a central region 96 defined by a separation line 98 and a lower region 100 defined by the edges of the label and separation line 102. Separation lines 98 and 102 may be formed by any known means including perforation or other weakening of the base paper. The region between store name/logo 94 and the separation line 102 will be used during a printing operation of the scale system to print name and price information and/or product bar code for the specified product to which the label is to be attached. The region below separation line 102 will be used during a printing operation of the scale system to print the message information for the predetermined product. In this regard, the lower region may include a pre-printed name and/or design element of the predetermined product in region 104, with the selectable message then being printed to the right of region 104.

Where the selectable message is a coupon discount message, the label structure rear surface 110 preferably includes a pre-printed coupon bar code 112 on the lower portion of the label so that when the lower portion of the label is detached, the coupon bar code stays with the coupon message printed on the front side. On the rear side of the region defined by separation line 98, other pre-printed information may be provided such as recipe type information. Where the selectable message information is a coupon discount message, a further step is in order to correlate the change in coupon discount information to the coupon bar code which will be scanned at check-out by the P.O.S. computer system 24 (FIG. 1). One or both of the P.O.S. computer system 24 and the store computer system 22 will include a stored discount amount associated with the coupon bar code 112. When the coupon discount message is changed, the stored discount amount associated with bar code 112 will also need to be changed at some point in the future. Generally, the stored discount amount associated with bar code 112 will be changed at a time corresponding to both the expiration of the valid period for coupons having a first coupon message and the beginning of the valid period for other coupons having a second coupon message. Links 26 and 28 facilitate adjustment of the stored discount amount associated with the coupon bar code 112 as needed. The expiration date of a given coupon discount is printed on the front of the label (see Tables I and III) to prevent problems with customers attempting to use a coupon after the stored amount has been changed.

Figure 5:
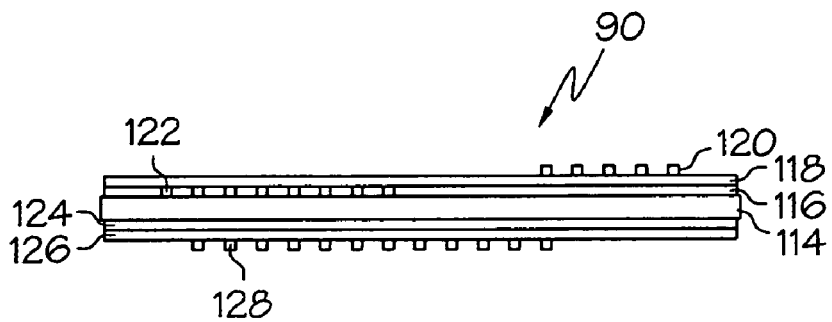
FIG. 5 is a cross sectional view along line 5—5 of FIG. 4A.
Figure 6:
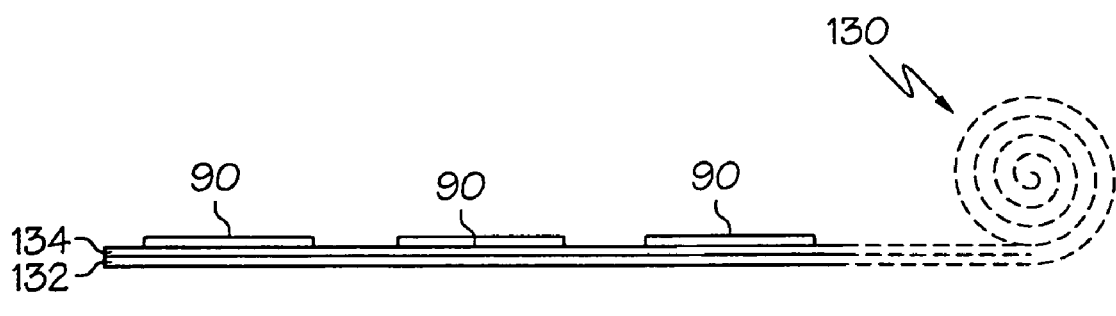
FIG. 6 is a side view of a supply roll of labels.

Referring again to FIGS. 4A and 4B, an important distinction exists between pre-printed information provided on a label and information which is printed by the in-store scale system. In particular, "pre-printed" information exists on the labels when supplied to a store and therefore cannot be changed or modified by the store unless a different label format is chosen/selected or unless an attempt is made to overwrite or black out a pre-printed message on the front of a label. Referring to the cross-sectional view of FIG. 5 the label structure 90 is formed by a base paper 114. Toward the front surface side of the base paper a layer 116 formed by a thermally sensitive composition is first provided and atop the thermal layer 116 a layer or coating 118 of a sealing composition is provided to prevent loss of the thermal layer 116. Atop the sealing layer 118 an ink-based layer 120 of pre-printed information is provided in those regions where such pre-printing is desired. When indicia 122 (e.g. selectable messages) are printed by the thermal print head of the scale, such messages are formed in the thermal layer 116 but are visible through the clear sealing layer 118. Toward the rear side of the base paper 114 a layer 124 of an adhesive composition is provided for securing the label to a product package. In those regions where pre-printed information is provided on the rear surface of the label 90, the adhesive layer 124 is covered by an adhesive deadening layer 126 so that that portion of the label can be removed from the package easily. The adhesive deadening layer may typically be formed by a layer of white ink applied over the adhesive. An ink-based layer 128 of pre-printed information (e.g. coupon bar code or recipe) is then applied over the adhesive deadening layer. Referring to FIG. 6 a representative supply roll 130 of label structures 90 is shown. The supply roll includes a liner 132 having a silicone release layer 134 applied thereto such that when the adhesive side of label structures 90 is applied to the liner they can be easily removed for dispensing from the scale and application to a product package.

The manufacturing method for producing such label stock involves starting with a wide roll of stock with label material with adhesive side attached to the release surface base paper. The label material is then re-applied to the base paper. The label material is then die cut to form individual labels and length cut to form multiple label supply rolls.

After printing product information and message information on a label as described above, the resulting label structure may be that shown in FIGS. 7A and 7B where front and rear surface portions of a printed label structure 140 are shown. In particular the front surface 142 of printed label structure 140 includes a product bar code 144 thereon as printed by the scale print head. The rear surface 146 of the label structure includes the pre-printed coupon bar code 148. This arrangement eliminates the possibility that the P.O.S. scanners will confuse the two bar codes during check-out. Because the coupon portion of the label might be removed by the consumer prior to check-out, the product bar code 146 on the front surface is preferably positioned at a location spaced from but proximate to a location of the scannable coupon information bar code. In this regard, the term "proximate" is used to refer to a location which results in positioning of the product bar code 142 toward the same side 150 (FIG. 8) of a product package 152 as the coupon bar code 148 when the label is applied to the product package forming a label and package assembly 154.

Although the invention has been described and illustrated in detail it is to be clearly understood that the same is intended by way of illustration and example only and is not intended to be taken by way of limitation.

For example, while a major advantage of the above-described method provides retailers, product manufacturers, distributors and advertisers the ability to selective control messages printed on labels printed in a store, it is recognized that the user input device 54 may be used to selectively control messages as well. Thus, a method for controlling an in-store label coupon printing system is provided which involves providing an in-store label printing mechanism including a controller and associated memory, and a user input device, and providing a supply of labels for the in-store printing mechanism, each label including a pre-printed coupon bar code on a rear surface portion thereof. The user input device is selectively utilized to establish a coupon message to be printed on a front surface of the labels by the in-store printing mechanism. A stored discount amount associated with the coupon bar code is provided in at least one of an in-store point-of-sale computer system memory and a store computer system memory. The stored discount amount can be adjusted to coincide with changes made in the coupon message printed by the in-store label printing mechanism.

Further, while the use of a scale system with an associated print head is primarily discussed herein, it is recognized that other in-store label printing mechanisms could also be used for selective control of messages printed on labels.

Accordingly, the spirit and scope of the invention are to be limited only by the terms of the appended claims.

What is claimed is:

1. A method for distributing a coupon and a product pricing label, the method including the steps of:
   utilizing a supply of labels in the form a liner having a release surface, a plurality of labels removably attached to the release surface of the liner and each including a coupon portion, a product pricing portion, a front side and a read side, the coupon portion having a pre-printed coupon bar code located at the rear side thereof to face toward the release surface of the liner, the pre-printed coupon bar code relates to a predetermined product and the front side of the coupon portion includes pre-printed information regarding the predetermined product, the front side of the product pricing portion having a pricing region for having price information printed thereon, wherein at least one separation line is formed between the coupon portion and the product pricing portion, wherein the rear side of the product pricing portion is adhesive and the rear side of the coupon portion is deadened, wherein the liner and the plurality of labels are formed into a roll;
   incorporating the supply of labels into a scale having an associated printer, the scale located in a store;
   weighing a food product with the scale;
   printing, with the printer of the scale, pricing information for the weighed food product in the pricing region on the product pricing portion of a given label of the plurality of labels;
   after the printing step, applying the given label to a package containing the weighed food product while the coupon portion and product pricing portion remain attached to one another, the given label applied such that the pre-printed coupon bar code of the coupon portion faces downward against the package and the given label is held to the package by adhesive at the rear side of the product pricing portion; and
   providing the package to a customer in the store.

2. The method of claim 1 including the further step of scanning the pre-printed coupon bar code of the coupon portion of the given label when the coupon portion is removed from the product pricing portion and presented at checkout.

3. The method of claim 1 wherein the scale is located in a perishables department of the store and the food product is a perishable food product.

4. The method of claim 1 wherein the scale is part of a weigh/wrap machine in the store.

5. The method of claim 1 wherein the preprinted information regarding the predetermined product includes a name of the product.

6. The method of claim 5 wherein the preprinted information regarding the predetermined product includes a design element of the predetermined product.

7. A method for distributing a coupon and a product pricing label, the method including the steps of:
   utilizing a supply of labels in the form a liner having a release surface, a plurality of labels removably attached to the release surface of the liner, a multiplicity of the labels including a coupon portion, a product pricing portion, a front side and a rear side, the coupon portion having a pre-printed coupon bar code located at the rear side thereof to face toward the release surface of the liner, the pre-printed coupon bar code relates to a predetermined product and the front side of the coupon portion includes pre-printed information regarding the predetermined product, the front side of the product pricing portion having a pricing region for having price information printed thereon, wherein at least one separation line is formed between the coupon portion and the product pricing portion, wherein the rear side of the product pricing portion is adhesive and the rear side of the coupon portion is deadened, wherein the liner and labels are formed into a roll;
   incorporating the supply of labels into a scale having an associated printer, the scale located in a store;
   weighing a food product with the scale;
   printing, with the printer of the scale, pricing information for the weighed food product in the pricing region on the product pricing portion of a given label of the multiplicity of labels;
   after the printing step, outputting the given label from the scale and applying the given label to a package containing the weighed food product while the coupon portion and product pricing portion remain attached to one another, the given label applied such that the pre-printed coupon bar code of the coupon portion faces downward against the package and the adhesive of the product pricing portion holds the given label to the package.

8. The method of claim 7 wherein the package, with the given label applied thereto, is provided to a customer in the store.

9. The method of claim 7 wherein the preprinted information regarding the predetermined product includes a name of the product.

10. The method of claim 7 wherein the preprinted information regarding the predetermined product includes a design element of the predetermined product.

11. A method for distributing a coupon and a product pricing label, the method including the steps of:
   utilizing a supply of labels in the form of a liner including a release surface, a plurality of labels removably attached to the release surface of the liner and including a coupon portion, a product pricing portion, a rear side and a front side, the coupon portion having a pre-printed bar code located at the rear side thereof to face toward the release surface of the liner, the front side of the product pricing portion including a pricing region for having at least price information printed thereon, at least one separation line between the coupon portion and the product pricing portion, wherein the liner and labels are formed into a roll;
   incorporating the supply of labels into a scale having an associated printer;
   weighing a food product using the scale;

printing, with the printer of the scale, pricing information for the weighed food product in the pricing region on the product pricing portion of a given label of the plurality of labels;

after the printing step, applying the given label to a package containing the weighed food product while the coupon portion and product pricing portion remain attached to one another, the given label applied with the pre-printed bar code facing downward against the package and such that adhesive of the product pricing portion of the given label holds the label to the package but the coupon portion is removable from the package by separation from the product pricing portion along the separation line; and providing the package to a customer.

12. The method of claim 11 including the further step of scanning the pre-printed bar code of the coupon portion of the given label when the coupon portion is removed from the product pricing portion and presented at checkout.

13. The method of claim 11 wherein the scale is located in a perishables department of the store and the food product is a perishable food product.

14. The method of claim 11 wherein the scale is part of a weigh/wrap machine in the store.

15. A method for distributing a coupon and a product pricing label, the method including the steps of:

utilizing a supply of labels in the form of a liner including a release surface, a plurality of labels removably attached to the release surface of the liner, a multiplicity of the labels each including a coupon portion, a product pricing portion, a front side and a rear side, the coupon portion having a pre-printed bar code pertaining to a specific product, the pre-printed bar code located at the rear side of the coupon portion to face toward the release surface of the liner, the rear side of the coupon portion is deadened, the front side of the coupon port includes a pre-printed name of the specific product and a pre-printed design element associated with the specific product, the front side of the product pricing portion includes a pricing region for having at least price information printed thereon, the rear side of the product pricing portion is adhesive, at least one separation line between the coupon portion and the product pricing portion, wherein the liner and labels are formed into a roll;

incorporating the supply of labels into a scale having an associated printer;

weighing a food product using the scale;

printing, with the printer of the scale, pricing information for the weighed food product in the pricing region on the product pricing portion of a given label of the multiplicity of labels;

after the printing step, applying the given label to a package containing the weighed food product while the coupon portion and product pricing portion remain attached to one another, the given label applied such that the pre-printed bar code of the coupon portion faces downward against the package thereby preventing scanning of the pre-printed bar code in such orientation.

16. The method of claim 15 including the further step of providing the package, with the given label applied thereto, to a customer.

\* \* \* \* \*

UNITED STATES PATENT AND TRADEMARK OFFICE
CERTIFICATE OF CORRECTION

| | | |
|---|---|---|
| PATENT NO. | : 7,099,038 B2 | Page 1 of 1 |
| APPLICATION NO. | : 10/967799 | |
| DATED | : August 29, 2006 | |
| INVENTOR(S) | : Robert J. Schuller | |

It is certified that error appears in the above-identified patent and that said Letters Patent is hereby corrected as shown below:

Col. 9

Line 20, Insert -- of-- after "form".

Line 24, Change "read" to -- rear --.

Col. 10

Line 6, Insert -- of -- after "form".

Signed and Sealed this

Twenty-eighth Day of November, 2006

JON W. DUDAS
*Director of the United States Patent and Trademark Office*